(12) United States Patent
Vardhan et al.

(10) Patent No.: US 10,121,158 B2
(45) Date of Patent: Nov. 6, 2018

(54) OPTIMIZING VEHICLE RECHARGING TO LIMIT USE OF ELECTRICITY GENERATED FROM NON-RENEWABLE SOURCES

(71) Applicant: GENERAL MOTORS LLC, Detroit, MI (US)

(72) Inventors: Vijay Vardhan, Sterling Heights, MI (US); Mohan Jayaraman, Sterling Heights, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 730 days.

(21) Appl. No.: 13/871,639

(22) Filed: Apr. 26, 2013

(65) Prior Publication Data

US 2014/0324510 A1 Oct. 30, 2014

(51) Int. Cl.
*G06F 19/00* (2018.01)
*G06Q 30/02* (2012.01)
*G06Q 10/06* (2012.01)

(52) U.S. Cl.
CPC ... *G06Q 30/0202* (2013.01); *G06Q 10/06314* (2013.01); *Y04S 50/14* (2013.01)

(58) Field of Classification Search
CPC ......... G06Q 30/0202; G06Q 10/06314; G06Q 10/04; Y04S 50/14; Y04S 10/126; Y02T 90/163; Y02T 10/7088; Y02T 10/7094; Y02T 90/168; Y02T 10/84; Y02E 40/72; B60L 11/1844; B60L 11/1824; B60L 11/184; B60L 11/1842; B60L 2240/72; B60L 15/2045; G05B 15/02

USPC .......................................................... 700/291
See application file for complete search history.

(56) References Cited

U.S. PATENT DOCUMENTS

| 8,054,048 | B2 * | 11/2011 | Woody | B60K 6/48 180/65.1 |
| 8,761,948 | B1 * | 6/2014 | Ippolito | G05F 1/67 174/364 |
| 9,024,571 | B2 * | 5/2015 | Uyeki | B60L 11/184 320/101 |
| 9,348,492 | B1 * | 5/2016 | Penilla | B60W 40/08 |
| 9,429,974 | B2 * | 8/2016 | Forbes, Jr. | H02J 3/32 |
| 9,545,853 | B1 * | 1/2017 | Penilla | B60L 11/1824 |
| 2004/0217162 | A1 * | 11/2004 | Chigira | G06Q 10/08 235/379 |
| 2008/0262667 | A1 * | 10/2008 | Otabe | B60W 10/06 701/22 |
| 2009/0066287 | A1 * | 3/2009 | Pollack | G06Q 50/00 320/101 |

(Continued)

*Primary Examiner* — Darrin D Dunn
(74) *Attorney, Agent, or Firm* — Leydig, Voit & Mayer, Ltd.

(57) ABSTRACT

Methods and systems for maximizing the proportion of renewable energy relative to the total energy used during the charging of electrically powered vehicles are described. The methods and systems contemplate the acquisition, by a TSP, of data pertaining to the renewable energy mixture, i.e. the ratio of energy produced from renewable sources to energy produced from non-renewable sources, of the energy provided by one or more utility companies. Renewable energy mixture forecasts and information pertaining to charging and use of one or more vehicles are used to generate schedules for charging one or more electrically powered vehicles such that the use of renewable energy in vehicle charging is optimized.

13 Claims, 5 Drawing Sheets

(56) References Cited

U.S. PATENT DOCUMENTS

| | | | |
|---|---|---|---|
| 2009/0091291 A1* | 4/2009 | Woody | B60K 6/48 320/109 |
| 2009/0312903 A1* | 12/2009 | Hafner | B60L 8/003 701/36 |
| 2009/0313033 A1* | 12/2009 | Hafner | B60L 8/003 705/1.1 |
| 2009/0313098 A1* | 12/2009 | Hafner | B60L 8/003 705/14.1 |
| 2009/0313103 A1* | 12/2009 | Ambrosio | B60L 8/00 705/14.25 |
| 2010/0017249 A1* | 1/2010 | Fincham | B60L 3/12 705/412 |
| 2010/0082277 A1* | 4/2010 | Ballard | B60L 11/1809 702/63 |
| 2010/0219983 A1* | 9/2010 | Peleg | H02J 13/0062 340/870.17 |
| 2011/0130885 A1* | 6/2011 | Bowen | B60L 3/12 700/291 |
| 2011/0191186 A1* | 8/2011 | Levy | G06F 3/048 705/14.58 |
| 2011/0191220 A1* | 8/2011 | Kidston | G06Q 30/04 705/34 |
| 2011/0202221 A1* | 8/2011 | Sobue | B60K 16/00 701/22 |
| 2011/0204720 A1* | 8/2011 | Ruiz | B60L 11/1816 307/66 |
| 2011/0246252 A1* | 10/2011 | Uesugi | B60L 3/12 705/7.12 |
| 2011/0282508 A1* | 11/2011 | Goutard | H04L 63/20 700/293 |
| 2011/0282527 A1* | 11/2011 | Inbarajan | B60L 11/1809 701/22 |
| 2011/0282535 A1* | 11/2011 | Woody | B60K 6/48 701/22 |
| 2011/0307109 A1* | 12/2011 | Sri-Jayantha | G06Q 10/04 700/291 |
| 2012/0016551 A1* | 1/2012 | Krause | B60W 50/14 701/32.3 |
| 2012/0049793 A1* | 3/2012 | Ross | H01M 10/44 320/109 |
| 2012/0065831 A1* | 3/2012 | Ross | B60L 11/1816 701/29.1 |
| 2012/0133337 A1* | 5/2012 | Rombouts | H02J 3/32 320/155 |
| 2012/0191524 A1* | 7/2012 | Ambrosio | B60L 8/00 705/14.23 |
| 2012/0323386 A1* | 12/2012 | Ito | H02J 3/32 700/291 |
| 2013/0054045 A1* | 2/2013 | Ramezani | B60L 11/1844 700/297 |
| 2013/0113413 A1* | 5/2013 | Harty | H01M 10/465 320/101 |
| 2013/0151012 A1* | 6/2013 | Shetty | G05D 23/1923 700/276 |
| 2013/0154561 A1* | 6/2013 | Gadh | H02J 7/0027 320/109 |
| 2013/0179061 A1* | 7/2013 | Gadh | B60L 11/1842 701/123 |
| 2013/0261817 A1* | 10/2013 | Detmers | H02J 3/382 700/287 |
| 2013/0335033 A1* | 12/2013 | Kuribayashi | B60L 11/1824 320/137 |
| 2013/0339072 A1* | 12/2013 | Touge | G06Q 10/00 705/5 |
| 2014/0006137 A1* | 1/2014 | Melen | G06Q 10/1093 705/14.35 |
| 2014/0091747 A1* | 4/2014 | Uyeki | B60L 11/184 320/101 |
| 2014/0207362 A1* | 7/2014 | Shimotani | G08G 1/13 701/119 |
| 2014/0217976 A1* | 8/2014 | McGrath | B60L 11/1837 320/109 |
| 2014/0257583 A1* | 9/2014 | Wada | G06Q 50/06 700/291 |
| 2014/0312839 A1* | 10/2014 | Uyeki | B60L 11/1838 320/109 |
| 2014/0312841 A1* | 10/2014 | Baba | H02J 3/32 320/109 |
| 2014/0316939 A1* | 10/2014 | Uyeki | B60L 11/1844 705/26.9 |
| 2014/0330453 A1* | 11/2014 | Nakagawa | B60H 1/00428 701/2 |
| 2014/0358316 A1* | 12/2014 | Shichiri | H02J 3/383 700/297 |
| 2015/0151648 A1* | 6/2015 | Przybylski | B60L 11/1861 701/2 |
| 2016/0172859 A1* | 6/2016 | Marhoefer | H02J 3/32 700/295 |
| 2016/0359980 A1* | 12/2016 | Penilla | H04W 4/003 |

* cited by examiner

OPTIMIZING VEHICLE RECHARGING TO LIMIT USE OF ELECTRICITY GENERATED FROM NON-RENEWABLE SOURCES

TECHNOLOGY FIELD

The present disclosure relates generally to vehicular telematics systems and more specifically to the use of telematics units within electrically powered vehicles to develop optimal vehicle recharging schedules.

BACKGROUND

In recent years, both policy makers and consumers have become increasingly interested in developing and utilizing renewable energy sources. Policy makers have endorsed a number of initiatives designed to promote the use of renewable energy in an effort to satisfy a growing number of constituents who are concerned that the use of fossil fuels causes environmental degradation. The incentives for policy makers to promote the use of renewable energy will strengthen as their constituents become increasingly concerned with the potential environmental impact of using non-renewable sources for energy production.

Meanwhile, fossil fuel prices have skyrocketed as the global demand for energy has soared. Increasing consumer demand for energy derived from renewable sources is being driven by such economic factors. In recent years, the price of energy produced from renewables relative to the price of energy produced from traditional, non-renewable sources has decreased considerably. Consumer demand for renewable energy is likely to continue to increase as the global demand for energy and the price of traditional energy sources continue to increase.

SUMMARY OF THE INVENTION

Implementations of the present invention contemplate using the communication infrastructure represented by a network of telematics units communicatively coupled to a TSP in order to distribute data pertaining to the content of energy provided by one or more utility companies and to aggregate information related to charging one or more electrically powered vehicles. More specifically, implementations of the present invention contemplate the acquisition, by a TSP, of data pertaining to the renewable energy mixture, i.e. the ratio of energy produced from renewable sources to energy produced from non-renewable sources, of the energy provided by one or more utility companies. The TSP can acquire renewable energy mixture data periodically at regular intervals of time, analyze the data, and develop a forecast of the mixture of energy provided by utilities during future time intervals when vehicle charging events may occur. Alternatively, the TSP can acquire one or more forecasts of the mixture of energy provided by one or more utilities if any of the one or more utilities provide such forecasts. The TSP may then use the forecasts and information pertaining to the vehicular charging activities of one or more subscribers to schedule charging events for the subscribers in a manner that maximizes the proportion of renewable energy used relative to total energy used in vehicle charging.

One implementation consists of a method for scheduling, on a telematics unit, recharging events for an electrically powered vehicle so as to maximize the ratio of energy used during the recharging that is generated from renewable sources to energy used during the recharging that is produced from non-renewable sources, the method comprising providing a forecast of the renewable energy mixture of the energy provided by one or more utilities at one or more time intervals, and providing software based instructions to be executed by the telematics unit for charging the electrically powered vehicle, wherein the instructions are generated in response to the forecast of the renewable energy mixture and information pertaining to the availability of the vehicle for charging.

An additional implementation consists of a computer readable medium having stored thereon a set of computer executable instructions for scheduling, on a telematics unit, recharging events for an electrically powered vehicle so as to maximize the ratio of energy used during the recharging that is generated from renewable sources to energy used during the recharging that is produced from non-renewable sources, the set of instructions comprising instructions for providing a forecast of the renewable energy mixture of the energy provided by one or more utilities at one or more time intervals, and providing additional instructions to be executed by the telematics unit for charging the electrically powered vehicle, wherein the additional instructions are generated in response to the forecast of the renewable energy mixture and information pertaining to the availability of the vehicle for charging.

A further implementation consists of a system for scheduling, on a telematics unit, recharging events for an electrically powered vehicle so as to maximize the ratio of energy used during the recharging that is generated from renewable sources to energy used during the recharging that is produced from non-renewable sources, the system comprising a server for receiving information pertaining to a renewable energy mixture provided by one or more utilities, receiving information pertaining to the availability of a vehicle for charging, for providing a forecast of the renewable energy mixture of the energy provided by one or more utilities at one or more time intervals, and for providing software based instructions to be executed by the telematics unit for charging the electrically powered vehicle, wherein the software based instructions are generated in response to the forecast of the renewable energy mixture and information pertaining to the availability of the vehicle for charging.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

Figure 1:
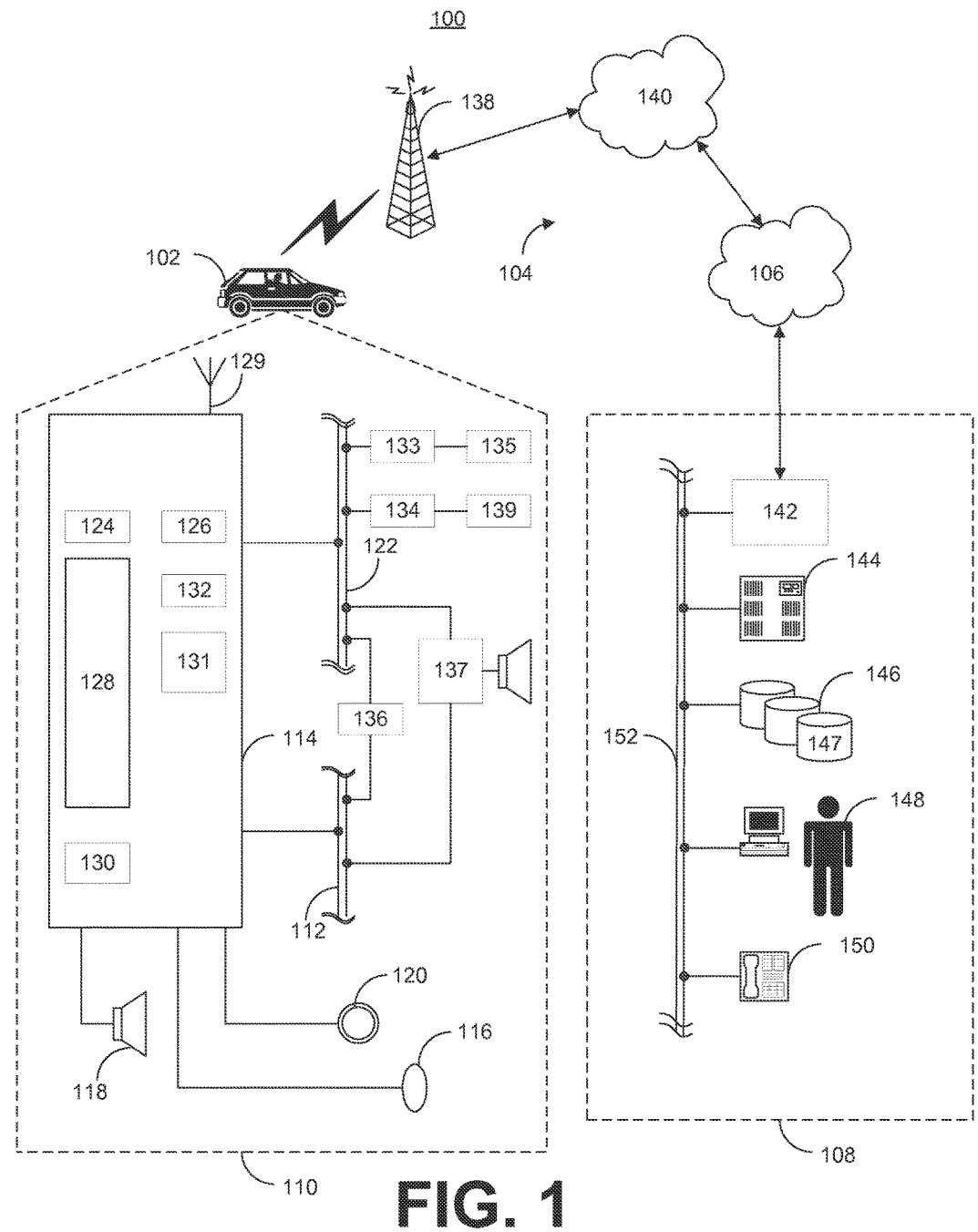
FIG. 1 is a schematic diagram of an operating environment for a mobile vehicle communication system usable in implementations of the described principles.

Before discussing the details of the invention, a brief overview of an example telematics system is given to guide the reader. FIG. 1 schematically depicts an example environment for carrying out the invention. It will be appreciated that the described environment is an example, and does not imply any limitation regarding the use of other environments to practice the invention. With reference to FIG. 1 there is shown an example of a communication system 100 that may be used with the present systems and methods and generally includes a vehicle 102, a wireless carrier system 104, a land network 106 and a call center 108. It should be appreciated that the overall architecture, setup and operation, as well as the individual components of a system such as that shown in FIG. 1 are generally known in the art. Thus, the following paragraphs provide a brief overview of one such example information system 100. However, present systems and methods could be carried out in other environments as well.

Vehicle 102 is a mobile vehicle such as a motorcycle, car, truck, recreational vehicle (RV), boat, plane, etc., and is equipped with suitable hardware and software that enables it to communicate over system 100. The vehicle 102 is, in particular, driven by an electric motor that periodically requires recharging. Additionally, vehicle hardware 110 shown generally in FIG. 1 includes: a telematics unit 114, a microphone 116, a speaker 118, and buttons and/or controls 120 connected to the telematics unit 114. A network connection or vehicle bus 122 is operatively coupled to the telematics unit 114. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name but a few.

The telematics unit 114 is an onboard device providing a variety of services through its communication with the call center 108, and generally includes an electronic processing device 128, one or more types of electronic memory 130, a cellular chipset/component 124, a wireless modem 126, a dual antenna 129 and a navigation unit containing a GPS chipset/component 132. In one example, the wireless modem 126 comprises, and is carried out in the form of, a computer program and/or set of software routines executing within the electronic processing device 128. The cellular chipset/component 124 and the wireless modem 126 may be called the network access device (NAD) of the telematics unit 114. The NAD 114 further includes a short-range wireless unit 131 capable of communicating with a user's mobile device such as a cellular phone, tablet computer, PDA, or the like, over a short-range wireless protocol. For example, in one implementation, the short-range wireless unit 131 is a Bluetooth unit with an RF transceiver that communicates with a user's mobile device using Bluetooth protocol.

The telematics unit 114 provides a variety of services for subscribers. Examples of such services include: turn-by-turn directions and other navigation-related services provided in conjunction with the GPS based chipset/component 132; airbag deployment notification and other emergency or roadside assistance-related services provided in connection with various crash and or collision sensor interface modules 133 and sensors 135 located throughout the vehicle. GPS navigation services are implemented based on the geographic position information of the vehicle provided by the GPS based chipset/component 132. A user of the telematics unit enters a destination using inputs corresponding to the GPS component, and a route to a destination is calculated based on the destination address and a current position of the vehicle determined at approximately the time of route calculation. Turn-by-turn (TBT) directions may further be provided on a display screen corresponding to the GPS component and/or through vocal directions provided through a vehicle audio component 137. It will be appreciated that the calculation-related processing may occur at the telematics unit or may occur at a call center 108.

Infotainment-related services are provided by the TSP wherein music, Web pages, movies, television programs, video games and/or other content is downloaded to an infotainment center 136 operatively connected to the telematics unit 114 via a vehicle bus 122 and an audio bus 112. In one example, downloaded content is stored for current or later playback.

The preceding list of functions is by no means an exhaustive list of all of the capabilities of telematics unit 114, as should be appreciated by those skilled in the art, but is simply an illustration of some of the services that the telematics unit 114 offers. The telematics unit 114 may include a number of components known by those skilled in the art in addition to those described above.

Vehicle communications use radio transmissions to establish a communications channel within the wireless carrier system 104 so that voice and/or data transmissions occur over the communications channel. Vehicle communications are enabled via the cellular chipset/component 124 for voice communications and a wireless modem 126 for data transmission. For example, data pertaining to a forecast of a utility's renewable energy mixture can be transmitted to the telematics unit 114 via the wireless modem 126.

To enable successful data transmission over the communications channel, wireless modem 126 applies some form of encoding or modulation to convert the digital data so that it can communicate through a vocoder or speech codec incorporated in the cellular chipset/component 124. Any suitable encoding or modulation technique that provides an acceptable data rate and bit error can be used with the present method. The dual mode antenna 129 services the GPS chipset/component and the cellular chipset/component.

The microphone 116 provides the driver or other vehicle occupant with a means for inputting verbal or other auditory commands, and can be equipped with an embedded voice processing unit utilizing a human/machine interface (HMI) technology known in the art. Conversely, the speaker 118 provides verbal output to the vehicle occupants and can be either a stand-alone speaker specifically dedicated for use with the telematics unit 114 or can be part of the vehicle audio component 137. In either event, the microphone 116 and the speaker 118 enable vehicle hardware 110 and the call center 108 to communicate with the occupants through audible speech.

The vehicle hardware also includes the one or more buttons or controls 120 configured to enable a vehicle occupant to activate or engage one or more of the vehicle hardware components 110. For example, one of the buttons 120 is an electronic push button that, when pressed, initiates voice communication with the call center 108 (whether it be a live advisor 148 or an automated call response system). In another example, one of the buttons 120, when pushed, initiates emergency services.

The audio component 137 is operatively connected to the vehicle bus 122 and the audio bus 112. The audio component 137 receives analog information, rendering it as sound, via the audio bus 112. Digital information is received via the vehicle bus 122. The audio component 137 provides AM and FM radio, CD, DVD, and multimedia functionality independent of the infotainment center 136. The audio component 137 contains a speaker system, or alternatively utilizes the speaker 118 via arbitration on the vehicle bus 122 and/or the audio bus 112.

The vehicle crash and/or collision detection sensor interface 133 is operatively connected to the vehicle bus 122. The crash sensors 135 provide information to the telematics unit 114 via the crash and/or collision detection sensor interface 133 regarding the severity of a vehicle collision, such as the angle of impact and the amount of force sustained.

Vehicle sensors 139, connected to various sensor interface modules 134 are operatively connected to the vehicle bus 122. Vehicle sensors can include but are not limited to gyroscopes, accelerometers, magnetometers, emission detection and/or control sensors, and the like. The sensor interface modules 134 can include power train control, climate control, and body control, to name but a few.

The wireless carrier system 104 can be a cellular telephone system or any other suitable wireless system that transmits signals between the vehicle hardware 110 and the land network 106. According to an example, the wireless carrier system 104 includes one or more cell towers 138, base stations and/or mobile switching centers (MSCs) 140, as well as any other networking components required to connect the wireless system 104 with the land network 106. The mobile switching center may include a remote data server.

As appreciated by those skilled in the art, various cell tower/base station/MSC arrangements are possible and could be used with the wireless system 104 (also referred to as the "cellular network" herein). For example, a base station and a cell tower could be co-located at the same site or they could be remotely located, a single base station could be coupled to various cell towers, and various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network component as well.

The land network 106 is, for example, a conventional land-based telecommunications network connected to one or more landline telephones and connecting wireless carrier network 104 to call center 108. For example, the land network 106 includes a public switched telephone network (PSTN) and/or an Internet protocol (IP) network, as is appreciated by those skilled in the art. Of course, one or more segments of the land network 106 are implemented in the form of a standard wired network, a fiber or other optical network, a cable network, other wireless networks such as wireless local networks (WLANs) or networks providing broadband wireless access (BWA), or any combination thereof.

The call Center (OCC) 108 is designed to provide the vehicle hardware 110 with a number of different system back-end functions and, according to the example shown here, generally includes one or more switches 142, servers 144, databases 146, live advisors 148, and a variety of other telecommunication and computer equipment 150 that is known to those skilled in the art. These various call center components are coupled to one another, for example, via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of telecommunication and computer equipment 150 for demodulation and further signal processing.

The telecommunication and computer equipment 150 includes a modem that preferably includes an encoder, as previously explained, and can be connected to various devices such as application servers 144 and databases 146. For example, the databases 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

A renewable energy portion of the databases 146 stores information related to the renewable energy mixture, i.e. the ratio of energy produced from renewable sources to energy produced from non-renewable sources, from one or more utility companies. The renewable energy portion 147 can store the renewable energy mixture data for a particular utility in a variety of time intervals. For example, energy data can be stored by intervals of an hour, a minute, a second and by intervals of a day, a week, a month, or a year. Energy data can also be stored by geographic location or otherwise. The renewable energy portion 147 may store renewable energy mixture data in a variety of data structures and may index the renewable energy mix data by a variety of fields. In some implementations, the renewable energy portion 147 stores raw data representing a history of the energy mixture provided by one or more utilities and a forecast of the energy mixture one or more utilities will provide in the future. The renewable energy portion 147 stores information pertaining to the renewable energy mixture as one or more of a quantitative value of the renewable energy available and the total energy available or a combination thereof, possibly in Megawatts (MW). Alternatively or additionally, information pertaining to the renewable energy mixture can be stored as a qualitative category of the renewable energy mixture level, e.g. high, medium, or low, and/or a qualitative time of use category, e.g. low-peak, mid-peak, or high-peak.

The servers 144 interface with electric utilities (not shown), databases 146, including the renewable energy portion 147, and telematics units such as the telematics unit 114. The servers 144 have processors that can be configured to calculate a forecast of the future renewable energy mixture provided by one or more utilities based upon data representing a past history of the renewable energy mixture provided by the one or more utilities. The forecast of the future renewable energy mixture provided by a utility can be provided by time intervals denominated by second, minute, hour, day, or a variety of other lengths of time. Processors of the servers 144 can also be configured to map raw data representing a quantitative value of the renewable energy mixture or a quantitative forecast of the renewable energy mixture to a qualitative category representing a level of renewable energy available. The processors of the servers 144 can also be configured to determine a time of use category representing a level of the total energy used by the customers of a utility for each time interval for which renewable energy mixture data is provided or forecasted.

In general terms, not intended to limit the claims, the example environment may be used by systems and methods that utilize telematics units to schedule vehicle recharging events in a manner so as to maximize, during the recharging, the ratio of the use of energy derived from renewable sources to the use of energy derived from non-renewable sources. The systems and methods involve obtaining a forecast of the renewable energy mixture of the energy provided by one or more electrical utilities during various time intervals. Obtaining the forecast may involve receiving a forecast from a utility or receiving raw data from the utility and generating a forecast there from. In some implementations, the systems and methods assign categories of renewable energy mixture level to each time interval for which the energy mixture data or energy mixture forecast is provided. The methods and systems can also assign a time of use category to each time interval for which the energy mixture data or energy mixture forecast is provided. The time intervals for which renewable energy mixture level categories and time of use categories are assigned need not correspond exactly to the time intervals for which energy mixture data or energy mixture forecasts are provided. For example, time intervals for which energy mixture level categories or time of use categories are assigned may cover multiple time intervals for which energy mixture data or time of use data are provided. Charging events can then be scheduled pursuant to the forecasted categories of the renewable energy mixture level or the forecasted time of use categories.

Telematics units within vehicles provide a communicative connection between a telematics service provider (TSP) and its subscribers. The communicative infrastructure provided by the network of telematics units enables the TSP to efficiently aggregate large amounts of information obtained from subscribers and their vehicles and also to efficiently disseminate information to large numbers of subscribers. The TSP can utilize such communication infrastructure to provide the subscribers with an array of services including but not limited to emergency notification and content dissemination. The network of telematics units can serve as an infrastructure for the efficient distribution of third party content to numerous subscribers. For example, the TSP may distribute multimedia content such as music and videos for subscribers' entertainment or may distribute geographic and map information for subscribers' use in finding a specific location.

Implementations of the present invention contemplate using the communication infrastructure represented by a network of telematics units communicatively coupled to a TSP in order to distribute data pertaining to the content of energy provided by one or more utility companies and to aggregate information related to the charging of one or more electrically powered vehicles. More specifically, implementations of the present invention contemplate the acquisition or generation, by a TSP, of a forecast of the renewable energy mixture during future time intervals during which vehicle charging events may occur. Implementations also contemplate the acquisition or development of information pertaining to vehicle charging activities of one or more subscribers. The TSP can then use the renewable energy mixture forecasts, coupled with the information pertaining to the vehicular charging activities, to schedule charging events for one or more subscribers in a manner that maximizes the use of renewable energy during vehicle charging.

Implementations of the present disclosure thereby involve increasing the usage ratio of energy produced from renewables to energy produced from non-renewables for charging electric vehicles. As the price of energy derived from non-renewables relative to the price of energy derived from renewables increases, consumers may attempt to reduce their energy costs by substituting renewables for non-renewables. The incentive to substitute renewable energy sources for non-renewable energy sources will further increase if regulators implement policies that impose costs on the use of non-renewable energy sources. For example, regulators may impose a carbon tax or a carbon emissions cap coupled with the issuance of transferable carbon credits.

As the price of fossil fuels rises, the cost of operating an electrically powered vehicle will decrease relative to the cost of operating a vehicle powered by an internal combustion engine. Therefore, a greater number of consumers will find purchasing an electrically powered vehicle, such as a plug-in electric vehicle (PEV), more economically desirable. This is true even if the price of the electrically powered vehicle exceeds that of the internal combustion vehicle. However, if the electricity used to charge electrically powered vehicles is derived primarily from non-renewable sources, the reduction in energy costs achieved through operating electrically powered vehicles will be less than in the case where the electricity used to charge the electrically powered vehicles is produced primarily from renewable sources.

Implementations of the present disclosure thereby provide a two-fold reduction in the carbon footprint of vehicular travel: decreasing carbon emissions attributable to the production of the energy used to charge electrically powered vehicles will decrease, and enticing a greater number of consumers to operate electrically powered vehicles instead of internal combustion vehicles by decreasing the operational costs of electrically powered vehicles relative to the operational costs of internal combustion vehicles.

Figure 2:
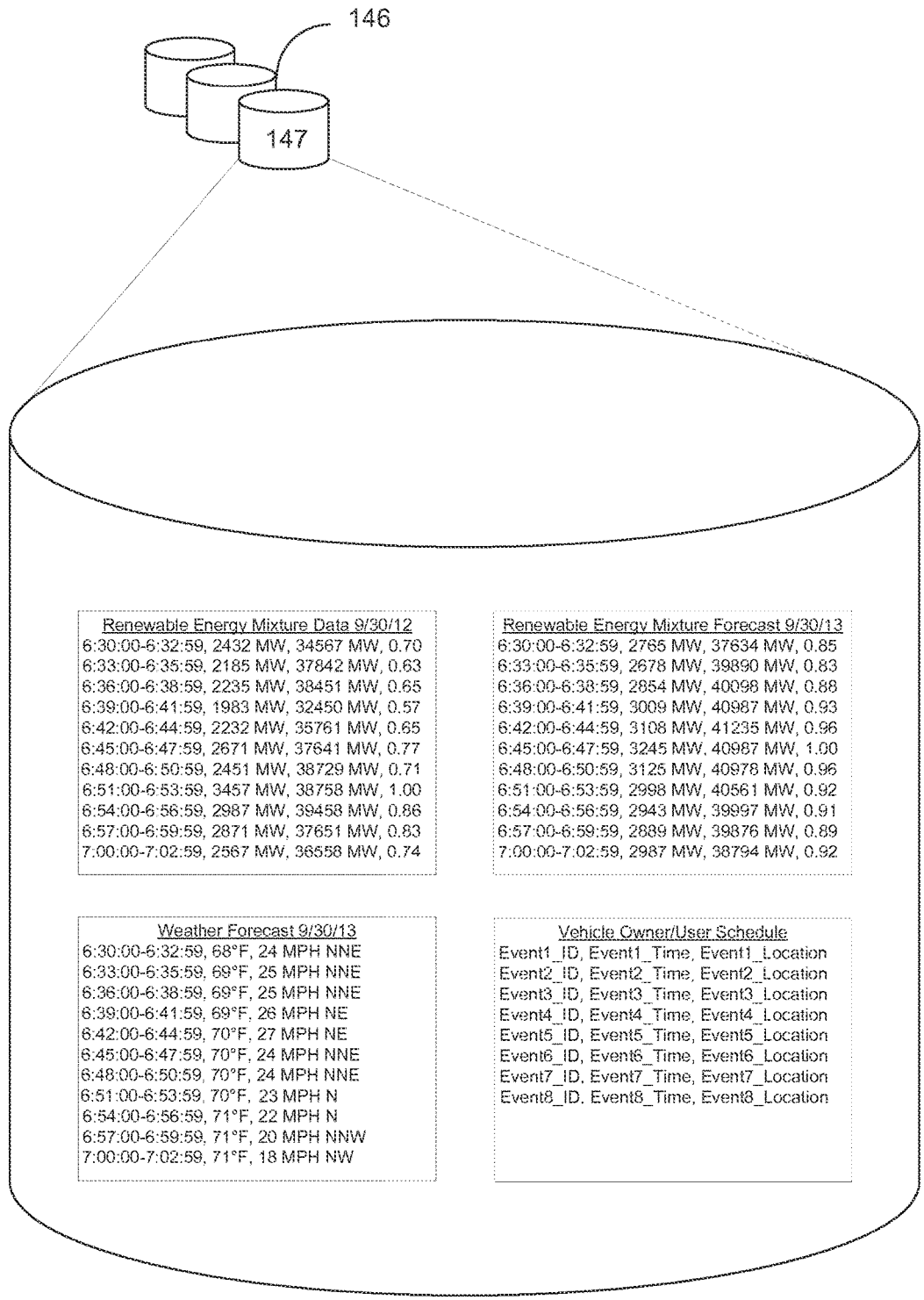
FIG. 2 is a flow chart summarizing steps for an example method for maximizing renewable energy usage in vehicle charging.

Turning now to FIG. 2, an example schematic diagram of the data stored in the renewable energy portion 147 of the databases 146 is depicted. The schematic diagram depicted in FIG. 2 is merely an example of the type of information that may be stored in the renewable energy portion 147 of the databases 146 and is not intended to display all types of information that may be stored in the renewable energy portion 147. In the example, the information stored in the renewable energy portion 147 would be present for a period on or about Sep. 29, 2013. FIG. 2 depicts an example set of renewable energy mixture data for a period from 6:30:00 to 7:02:59 on Sep. 30, 2012. The example set of renewable energy mixture data includes fields for time interval, total amount of renewable energy available (in MW), total amount of energy available (MW), and normalized value of renewable energy available (where the normalization is calculated only for the period for which values are displayed in FIG. 2).

The renewable energy portion 147 of the databases 146 can include multiple sets of renewable energy mixture data for different, possible overlapping time periods where the data is provided for time intervals of different lengths in different sets. For example, one set of data stored at the renewable energy portion 147 of the databases 146 can display the renewable energy mixture data in one second intervals, while another set of data can display the renewable energy mixture data in one minute intervals.

FIG. 2 further depicts data providing a weather forecast for an upcoming period of time for which a renewable energy mixture forecast is provided. The weather forecast depicted in FIG. 2 includes fields for time interval, temperature, and wind speed and direction. A weather forecast stored in the renewable energy portion 147 of the databases 146 can also include information pertaining to the amount of sunlight and the level of radiation from the sun reaching the surface of the Earth at a particular geographic location. Such weather information may be indicative of a variation in the amount of renewable energy produced by renewable energy sources, e.g. windmills and solar panels. In some implementations, weather forecasts, such as the one depicted in FIG. 2, may be stored elsewhere on the databases 146 or may be stored an altogether separate location.

FIG. 2 also depicts an example renewable energy mixture forecast. The renewable energy mixture forecast in FIG. 2 pertains to a period of time from 6:30:00 to 7:02:59 on Sep. 30, 2013. The example renewable energy mixture forecast includes fields for time interval, total amount of renewable energy available (in MW), total amount of energy available (MW), and normalized value of renewable energy available (where the normalization is calculated only for the period for which values are displayed in FIG. 2). The renewable energy mixture forecast may be calculated based on a variety of additional information that is stored either in the renewable energy portion 147 of the databases 146 or elsewhere. For example, the renewable energy mixture forecast may be calculated by using the renewable energy mixture data for the same time period one year earlier and increasing or decreasing the forecasted amount based upon the variance in weather conditions between the forecasted period and the period one year prior to the forecast. Statistical data aggregated over a number of periods may provide evidence that a certain increase in wind speeds will produce a certain increase in the amount of renewable energy available. Similarly, an increase in the amount of sunlight may be linked to a certain increase in the amount of renewable energy available. Long term trends demonstrating a certain percent increase or decrease in renewable energy available from one year to the next may also be taken into account when generating a forecast. For example, generating a forecast may involve starting with the amount of renewable energy available for the same time period one year in the past and adjusting the values up by five percent to account for a trend of increased renewable energy being available for the current year relative to the past year. More complicated statistical algorithms may also be used to forecast the amount of renewable energy available.

Additionally, FIG. 2 depicts a vehicle owner/user schedule. The vehicle owner/user schedule contains data pertaining to upcoming events that a user or owner of the vehicle may attend. The example vehicle owner/user schedule depicted in FIG. 2 has fields for an event identifier, an event time, and an event location. The data depicted in the vehicle owner/user schedule in FIG. 2 is not intended to be comprehensive, and additional fields may be included in implementations of the present invention. Additional event information may be provided. For example, information about the venue at which the event will take place may be included in a vehicle owner/user schedule. The event venue information may include information regarding the availability of vehicle charging equipment at the venue and a utility provider that supplies electricity to the vehicle charging equipment. The vehicle owner/user schedule data may also include any additional information that may be useful in scheduling vehicle charging event. In some implementations of the present invention, the vehicle owner/user schedule data may be stored elsewhere on the databases 146. For example, the vehicle owner/user schedule information may be stored at a subscriber account data structure. In alternative embodiments, the vehicle owner/user schedule information may be stored at an altogether separate location. For example, the vehicle owner/user schedule information may be stored at the telematics unit 114 or at a cloud storage device operated by a third party.

Figure 3:
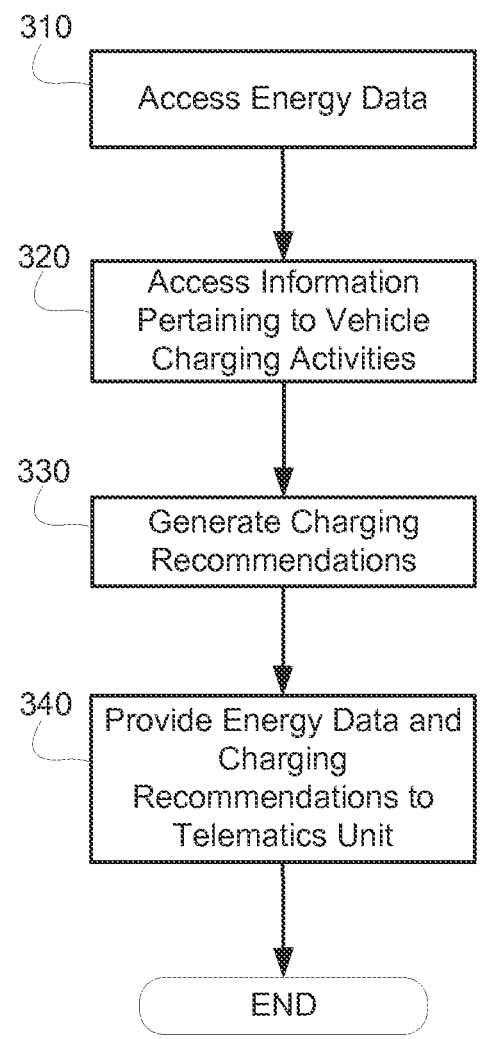
FIG. 3 is a flow chart summarizing steps for an example method for maximizing renewable energy usage in vehicle charging where an energy mixture forecast is provided.

Turning now to FIG. 3, a flow chart summarizing steps for an example method for maximizing renewable energy usage in vehicle charging is depicted. At step 310, energy data stored in the renewable energy portion 147 of databases 146 is accessed by a TSP. The energy data in the renewable energy portion 147 may be provided by a utility that owns and operates power plants and provides power to customers. Alternatively, the energy data may be provided by a third party that monitors the electricity output of utilities. Any other entity with access to such energy data and the authority to provide such data may also provide the energy data. The energy data contains at least some representation of the amount of energy generated from renewable sources relative to the overall amount of energy generated, i.e. the renewable mixture of the energy provided. The energy data may include a forecast of the renewable energy mixture in the future, a record of the renewable energy mixture in the past, or a combination thereof. The energy data may include a total amount of energy generated, e.g. in megawatts (MW), and a total amount of energy generated from renewable sources, e.g. in MW. The energy data may alternatively include a total amount of energy generated from renewable sources, e.g. in MW, and a total amount of energy generated from non-renewable sources, e.g. in MW. The energy data may also include a price per unit energy where the price is determined from the source of the energy mixture, e.g. low peak, mid-peak, and high peak prices. The energy data may be provided by time intervals of varying durations. For example, the energy data may be provided for each second, each minute, each hour, each day, each month, etc. For any given period of time, the energy mixture data may be provided in multiple intervals of differing durations. If the energy data does not include a forecast of the renewable energy mixture, the TSP may generate a forecast of the renewable energy mixture based upon the energy data.

At step 320, information pertaining to vehicle charging activities of one or more subscribers is accessed. Information pertaining to vehicle charging activities of the one or more subscribers may include prior charging history of the one or more vehicles, usage patterns of the one or more vehicles, and information indicative of the availability of the one or more vehicles for charging. For example, usage patterns of the vehicle and previous charging patterns of the vehicle may indicate that the vehicle is not available for charging between the hours of 7 AM-9 AM and between 5 PM and 8 PM. Furthermore, prior usage and charging patterns may indicate the vehicle is charged by one utility between the hours of 8 PM and 7 AM and by a different utility between 9 AM and 5 PM. Similarly, information stored by a user or owner of a vehicle on an electronic device capable of communicating with the NAD of a telematics unit can indicate that the vehicle will not be available for charging during certain intervals. An entry on a calendar application or a to-do list application may indicate that the vehicle will not be available for charging while a user or owner of the vehicle is engaged in some other activity. Similarly, usage history, charging patterns, and information pertaining to the schedule of a user of the vehicle may be used to determine an approximate level of charge that must be built up by the vehicle during a particular charging event. Information pertaining to usage and charging patterns and user schedules may be stored alongside subscriber information in a database such as, e.g., element 146 of FIG. 1. Alternatively, global recommendation information pertaining to usage and charging patterns and user schedules may be stored at the renewable energy portion 147 of databases 146.

At step 330, energy mixture based charging recommendations are generated based upon the energy data accessed at step 310 and the information pertaining to vehicle charging activities accessed at step 320. The charging recommendations may require additional input from the telematics unit before they are executable. The charging recommendations establish procedures for the vehicle to use while recharging. In some implementations, the charging recommendations instruct the telematics unit to allow the vehicle to charge at a specific time interval or at a particular set of time intervals. In other implementations, the charging recommendations define certain rules that the telematics unit can use to determine when charging events should take place. For example, the charging recommendations may establish logic that is evaluated by the telematics unit. The recommendations may provide that the vehicle may charge only during time intervals when the fraction of the total energy generated by renewable sources exceeds a predetermined threshold. Alternatively, the recommendations may dictate that the vehicle is allowed to charge based on a combination of the forecasted or historical renewable energy mixture and current charge level. For example, the conditions for vehicle charging may require a higher renewable energy mixture threshold when the battery is at a high charge level and require a lower renewable energy mixture threshold when the battery is at a lower charge level or when the vehicle usage history or usage forecast indicates that there will be limited charging opportunities prior to anticipated battery depletion. The charging recommendations may be stored on the renewable energy portion 147 of the databases 146 or may be stored elsewhere at the databases 146. Alternatively, the charging recommendations may be contained within a program running on a server, such as the servers depicted by element 144 in FIG. 1. The charging recommendations may be set by a user or they may set by a TSP, whether or not pursuant to guidelines set by a user or by some other entity, such as a utility company. Alternatively, the charging recommendations may reside on a telematics unit, such as the one depicted by element 114 in FIG. 1. At step 340, the TSP provides the energy data and/or charging recommendations to the telematics unit in the vehicle.

Figure 4:
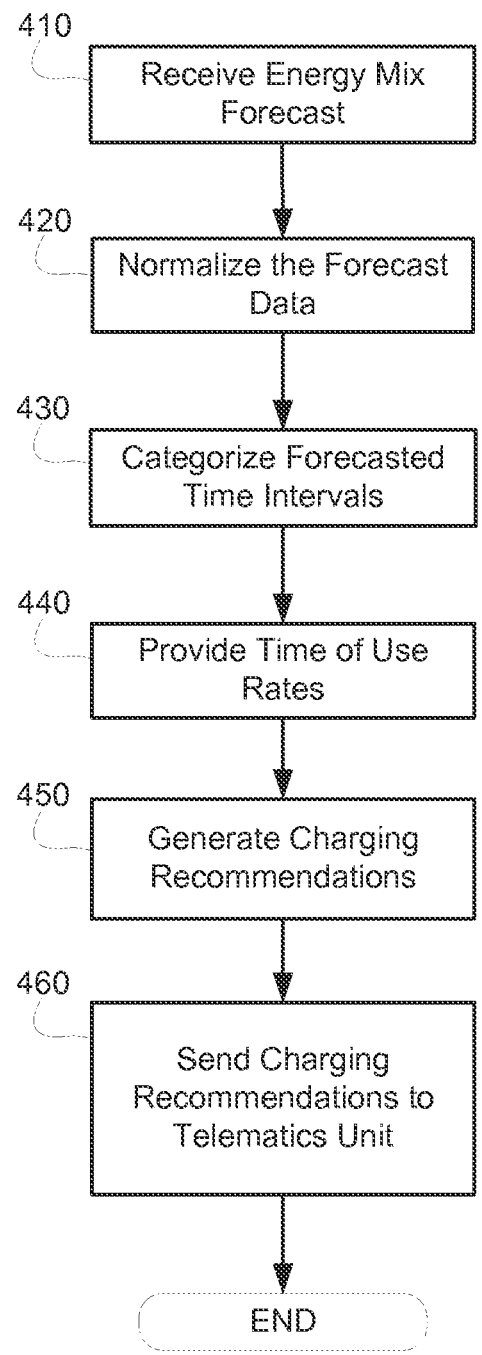
FIG. 4 is a flow chart summarizing steps for an example method for maximizing renewable energy usage in vehicle charging where an energy mixture forecast must be developed from raw data.

Turning now to FIG. 4, a flow chart is depicted that summarizes steps for an example method for maximizing renewable energy usage in vehicle charging where a renewable energy mixture forecast is provided to a TSP. At step 410, a renewable energy mixture forecast is received by the TSP. The renewable energy mixture forecast is a forecast of the amount of energy provided by one or more utilities that is generated from renewable sources during time intervals at some point in the future. The renewable energy mixture forecast may be provided by a utility that owns and operates power plants and provides power to customers. Alternatively, the forecast may be provided by a third party that monitors the electricity output of one or more utilities or any other entity with access to such energy data and the authority to provide such data. The forecast may be provided for multiple, possibly overlapping, time intervals of various durations. The forecast may include a total amount of energy generated, e.g. in MW, and a total amount of energy generated from renewable sources, e.g. in MW. The energy mix forecast may alternatively include a total amount of energy generated from renewable sources, e.g. in MW, and a total amount of energy generated from non-renewable sources, e.g. in MW. The forecast may also include a price per unit energy.

At step 420, the TSP normalizes the forecast data. Normalizing the forecast data entails first determining the maximum renewable energy level value for all time intervals in the period over which the forecast extends and subsequently determining the percentage of the maximum renewable energy level value represented by the renewable energy level values of each time interval included in the forecast. For example, if the maximum renewable energy level during the period over which the forecast extends is 2500 MW, and the renewable energy level for the time period between 9 AM and 10 AM on December 1 is 500 MW, the normalized value for the renewable energy level during that time interval would be 0.25.

At step 430, renewable energy level categories are assigned to time intervals extending over the duration of the period for which the forecast is provided. The time intervals for which energy level categories are assigned need not correspond exactly to the time intervals for which the forecast is provided. For example, the normalized values for the renewable energy levels of three time intervals for which the forecast is provided may be averaged and a category may be assigned to a time interval consisting of the three time intervals for which the forecast was provided. Categories, or classifications, may be defined in a number of ways and there are no restrictions on the number of categories that can be assigned nor are there any restrictions on the rules defining the categories. For example, the set of categories may consist of very low, low, medium, high, and very high. Continuing the example, each time interval of the forecast would then be assigned a category pursuant to the following rules: time intervals with a normalized renewable energy value from 0.00 to 0.19 are assigned the "very low" category, time intervals with a normalized renewable energy value from 0.20 to 0.39 are assigned the "low" category, time intervals with a normalized renewable energy value from 0.40 to 0.59 are assigned the "medium" category, time intervals with a normalized renewable energy value from 0.60 to 0.79 are assigned the "high" category, and time intervals with a normalized renewable energy value from 0.80 to 1.00 are assigned the "very high" category.

At step 440, a time of use (TOU) rate is provided for each of multiple time intervals that together extend over the duration of the period for which the forecast is provided. In some implementations, a single time of use rate will map to multiple categories. Similarly, in some implementations a single category will map to multiple time of use rates. In the later situation, the quantitative normalized renewable energy level is required to determine the time of use rate to map to the time intervals that are members of a particular category that maps to multiple time of use rates.

At step 450, charging recommendations are generated based upon the TOU rates and information pertaining to vehicle charging activities. The charging recommendations are generally configured to dictate that the vehicle will charge during time intervals when the renewable energy level is high while also ensuring that the vehicle will be able to attain a sufficient level of charge prior to the time at which a user needs to use the vehicle. Information pertaining to vehicle charging activities may include prior charging history of the vehicle, usage patterns of the vehicle, and information indicative of the availability of the vehicle for charging. Usage history, charging patterns, and information pertaining to the schedule of a user of the vehicle may be used to determine an approximate level of charge that must be built up by the vehicle during a particular charging event. Information pertaining to usage and charging patterns and user schedules may be stored at a database accessible by the TSP. Alternatively, some of the information pertaining to usage patterns, charging patterns, and user schedules may be stored at a telematics unit and the charging recommendations that are generated will require the telematics unit to consider such locally stored information.

At step 460, the telematics unit receives the charging recommendations and instructs the vehicle to charge pursuant to the energy data and charging recommendations received at step 450. If the charging recommendations require consideration of information stored locally at the telematics unit, such consideration also occurs at step 460.

Figure 5:
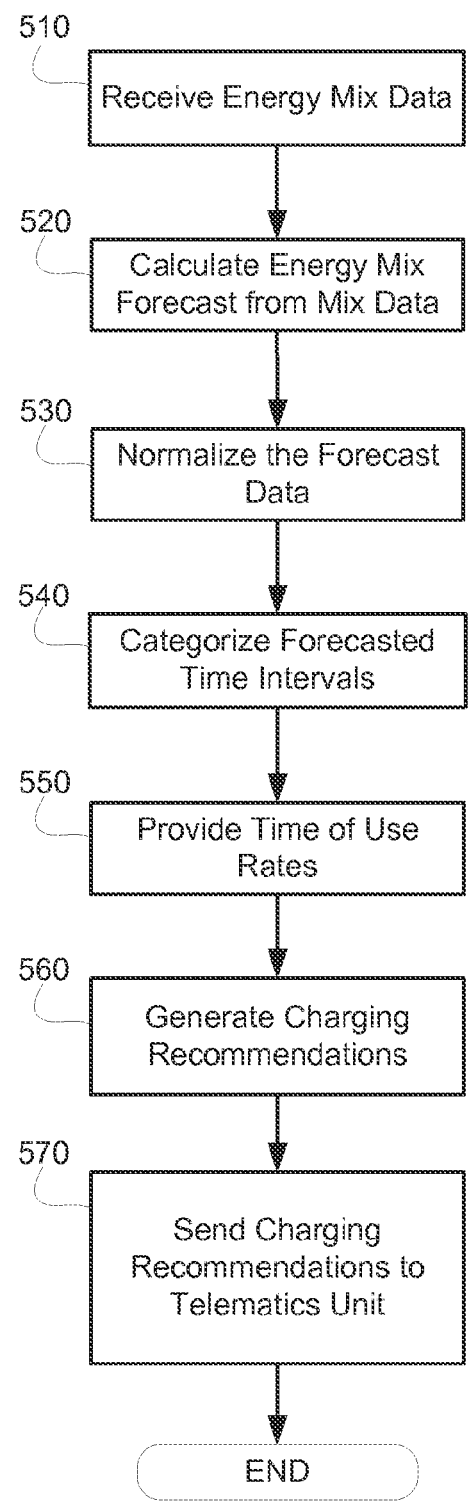
FIG. 5 is a flow chart summarizing steps for an example method for developing an energy mixture forecast from raw data.

FIG. 5 is a flow chart summarizing steps for an example method for maximizing renewable energy usage in vehicle charging where an energy mixture forecast must be developed from raw data. At step 510, renewable energy mixture data is received by the TSP. The renewable energy mixture data received by the TSP may be organized by multiple time intervals of varying durations. In some implementations, renewable energy mixture data is provided for multiple sets of time intervals that overlap with each other. For example, renewable energy mixture data for a period of one month may be provided in time intervals of one second increments, one minute increments, and one hour increments.

In some implementations, additional information that may have an impact on the renewable energy level provided by one or more utilities at some point in the future is also received by the TSP at step 510. For example, information pertaining to the weather may be useful in fine tuning a forecast of the renewable energy mixture at some point in the future. Windy conditions may increase the amount of renewable energy available if one or more utilities rely on windmills for energy generation. Cloudy conditions may decrease the amount of renewable energy available if one or more utilities rely on solar energy. Extremely hot conditions are likely to increase the total amount of energy demanded by the customers of one or more utilities as a result of an increase in energy consumed by air conditioners.

At step 520, the TSP generates a renewable energy mixture forecast from the data received at step 510. The renewable energy mixture forecast is a forecast of the amount of energy provided by one or more utilities that is generated from renewable sources during time intervals at some point in the future. The forecast may be generated for multiple, possibly overlapping, time intervals of various durations. The forecast may include a total amount of energy generated, e.g. in MW, and a total amount of energy generated from renewable sources, e.g. in MW. The energy mix forecast may alternatively include a total amount of energy generated from renewable sources, e.g. in MW, and a total amount of energy generated from non-renewable sources, e.g. in MW. The forecast may also include a price per unit energy. The forecast can be generated according to a variety of predictive algorithms that account for a variety of factors. In some implementations, predictive algorithms take information provided by a weather forecast into account. Other implementations may utilize predictive algorithms that account for a variety of other factors.

At step 530, the TSP normalizes the forecast data. Normalizing the forecast data entails first determining the maximum renewable energy level value for all time intervals in the period over which the forecast extends and subsequently determining the percentage of the maximum renewable energy level value represented by the renewable energy level values of each time interval included in the forecast. For example, if the maximum renewable energy level during the period over which the forecast extends is 2500 MW, and the renewable energy level for the time period between 9 AM and 10 AM on December 1 is 500 MW, the normalized value for the renewable energy level during that time interval would be 0.25.

At step 540, renewable energy level categories are assigned to time intervals extending over the duration of the period for which the forecast is provided. The time intervals for which energy level categories are assigned need not correspond exactly to the time intervals for which the forecast is provided. For example, the normalized values for the renewable energy levels of three time intervals for which the forecast is provided may be averaged and a category may be assigned to a time interval consisting of the three time intervals for which the forecast was provided. Categories, or classifications, may be defined in a number of ways and there are no restrictions on the number of categories that can be assigned nor are there any restrictions on the rules defining the categories. For example, the set of categories may consist of very low, low, medium, high, and very high. Continuing the example, each time interval of the forecast would then be assigned a category pursuant to the following rules: time intervals with a normalized renewable energy value from 0.00 to 0.19 are assigned the "very low" category, time intervals with a normalized renewable energy value from 0.20 to 0.39 are assigned the "low" category, time intervals with a normalized renewable energy value from 0.40 to 0.59 are assigned the "medium" category, time intervals with a normalized renewable energy value from 0.60 to 0.79 are assigned the "high" category, and time intervals with a normalized renewable energy value from 0.80 to 1.00 are assigned the "very high" category.

At step 550, a time of use (TOU) rate is provided for each of multiple time intervals that together extend over the duration of the period for which the forecast is provided. In some implementations, a single time of use rate will map to multiple categories. Similarly, in some implementations a single category will map to multiple time of use rates. In the later situation, the quantitative normalized renewable energy level is required to determine the time of use rate to map to the time intervals that are members of a particular category that maps to multiple time of use rates.

At step 560, charging recommendations are generated based upon the TOU rates and information pertaining to vehicle charging activities. The charging recommendations are generally configured to dictate that the vehicle will charge during time intervals when the renewable energy level is high while also ensuring that the vehicle will be able to attain a sufficient level of charge prior to the time at which a user needs to use the vehicle. Information pertaining to vehicle charging activities may include prior charging history of the vehicle, usage patterns of the vehicle, and information indicative of the availability of the vehicle for charging. Usage history, charging patterns, and information pertaining to the schedule of a user of the vehicle may be used to determine an approximate level of charge that must be built up by the vehicle during a particular charging event. Information pertaining to usage and charging patterns and user schedules may be stored at a database accessible by the TSP. Alternatively, some of the information pertaining to usage patterns, charging patterns, and user schedules may be stored at a telematics unit and the charging recommendations that are generated will require the telematics unit to consider such locally stored information.

At step 570, the telematics unit receives the charging recommendations and instructs the vehicle to charge pursuant to the energy data and charging recommendations received at step 560. If the charging recommendations require consideration of information stored locally at the telematics unit, such consideration also occurs at step 570.

It will be appreciated by those of skill in the art that the information exchanged between the user, the call center, and the recharging station may vary in content. For example, the call center may have the authority to schedule a recharging event on behalf of the user without allowing the user to select amongst appropriate recharging stations. In such an embodiment, the call center may select the recharging station that is the best match based upon the criteria selected by the user.

It will be appreciated by those of skill in the art that the execution of the various machine-implemented processes and steps described herein may occur via the computerized execution of computer-executable recommendations stored on a tangible computer-readable medium, e.g., RAM, ROM, PROM, volatile, nonvolatile, or other electronic memory mechanism. Thus, for example, the operations performed by the telematics unit may be carried out according to stored recommendations or applications installed on the telematics unit, and operation performed at the call center may be carried out according to stored recommendations or applications installed at the call center.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for scheduling, on a telematics unit of an electricaly powered vehicle, a future recharging event for the electrically powered vehicle, the method comprising:
   maintaining a forecast of renewable energy mixture of energy provided by one or more utilities at specified time intervals;
   generating a recharging recommendation for the electrically powered vehicle, to be executed by the telematics unit, for the future recharging event, wherein the recharging recommendation is generated based upon:
      the forecast of renewable energy mixture,
      vehicle usage time-of-day period patterns of the electrically powered vehicle, and
      schedule information, based upon a schedule containing time and location data for each of a set of upcoming events, indicating availability of the electrically powered vehicle for the future recharging event at a vehicle recharging venue;
   providing the recharging recommendation to the telematics unit of the electrically powered vehicle; and
   recharging, under control of instructions issued by the telematics unit according to the recharging recommendation, the electrically powered vehicle.

2. The method of claim 1, wherein the schedule information includes at least one of the group consisting of: information stored on a calendar application of a computerized device, and information stored on an application of a computerized device that provides event reminders to a user.

3. The method of claim 1, wherein the forecast of the renewable energy mixture is one of the group consisting of: a forecast received by a telematics service provider and a forecast generated by a telematics service provider.

4. The method of claim 1, wherein the forecast of the renewable energy mixture is provided by time intervals wherein each time interval is associated with one of the group consisting of: a quantitative value of renewable energy available, a quantitative value of the total energy available, a quantitative value of the ratio of renewable energy available to total energy available, a normalized value of the quantity of renewable energy available, and a normalized value of the ratio of renewable energy available to total energy available.

5. The method of claim 1, wherein the forecast of the renewable energy mixture is provided by time intervals wherein each time interval is associated with one of the group consisting of: a qualitative renewable energy mixture level and a qualitative time of use level;
   wherein the qualitative renewable energy mixture level and the qualitative time of use level are defined by one of the group consisting of: a normalized value of the quantity of renewable energy available and a normalized value of the ratio of renewable energy available to total energy available.

6. The method of claim 1, wherein the forecast of the renewable energy mixture relies on one of the group consisting of: a weather forecast and a forecast of future events.

7. The method of claim 1, wherein the software based instructions require additional input from information stored locally at the vehicle.

8. A system for scheduling, on a telematics unit of an electrically powered vehicle, a future charging event for the electrically powered vehicle, the system comprising:
   the electrically powered vehicle; and
   a server for carrying out a method comprising:
      maintain a forecast of renewable energy mixture of energy provided by one or more utilities at specified time intervals;
   generating a recharging recommendation for the electrically powered vehicle, to be executed by the telematics unit, for the future recharging event, wherein the recharging recommendation is based upon:
   the forecast of renewable energy mixture,
   vehicle usage time-of-day period patterns of the electrically powered vehicle, and schedule information based upon a schedule containing time and location data for each of a set of upcoming events, indicating availability of the electrically powered vehicle for the future recharging event at a vehicle recharging venue;

providing the recharging recommendation to the telematics unit of the electrically powered vehicle; and wherein the electrically powered vehicle performs a recharging, under control of instructions issued by the telematics unit according to the recharging recommendation, the electrically powered vehicle.

9. The system of claim 8, wherein the schedule information includes at least one of the group consisting of: information stored on a calendar application of a computerized device, and information stored on an application of a computerized device that provides event reminders to a user.

10. The system of claim 8, wherein the forecast of the renewable energy mixture is one of the group consisting of: a forecast received by a telematics service provider and a forecast generated by a telematics service provider.

11. The system of claim 8, wherein the forecast of the renewable energy mixture is provided by time intervals wherein each time interval is associated with one of the group consisting of: a quantitative value of renewable energy available, a quantitative value of the total energy available, a quantitative value of the ratio of renewable energy available to total energy available, a normalized value of the quantity of renewable energy available, and a normalized value of the ratio of renewable energy available to total energy available.

12. The system of claim 8, wherein the forecast of the renewable energy mixture is provided by time intervals wherein each time interval is associated with one of the group consisting of: a qualitative renewable energy mixture level and a qualitative time of use level;

wherein the qualitative renewable energy mixture level and the qualitative time of use level are defined by one of the group consisting of: a normalized value of the quantity of renewable energy available and a normalized value of the ratio of renewable energy available to total energy available.

13. The system of claim 8, wherein the forecast of the renewable energy mixture relics on one of the group consisting of: a weather forecast and a forecast of future events.

* * * * *